US009083852B2

(12) United States Patent
David et al.

(10) Patent No.: US 9,083,852 B2
(45) Date of Patent: Jul. 14, 2015

(54) DATA TRANSMISSION SYSTEMS

(75) Inventors: Alki Andrew David, London (GB); Stan Fiskin, London (GB)

(73) Assignee: Dynamic Systems Limited (VC)

( * ) Notice: Subject to any disclaimer, the term of this patent is extended or adjusted under 35 U.S.C. 154(b) by 1423 days.

(21) Appl. No.: 12/522,560

(22) PCT Filed: Jan. 8, 2008

(86) PCT No.: PCT/GB2008/000060
§ 371 (c)(1),
(2), (4) Date: Jan. 19, 2010

(87) PCT Pub. No.: WO2008/084222
PCT Pub. Date: Jul. 17, 2008

(65) Prior Publication Data
US 2010/0146258 A1 Jun. 10, 2010

(30) Foreign Application Priority Data

Jan. 9, 2007 (GB) .................................. 0700358.5
Jul. 5, 2007 (GB) .................................. 0713087.5
Jul. 17, 2007 (GB) .................................. 0713884.5

(51) Int. Cl.
*H04L 29/06* (2006.01)
*H04N 7/167* (2011.01)
(Continued)

(52) U.S. Cl.
CPC .............. *H04N 7/1675* (2013.01); *G06F 21/10* (2013.01); *H04N 21/2225* (2013.01); *H04N 21/234309* (2013.01); *H04N 21/2543* (2013.01);
(Continued)

(58) Field of Classification Search
None
See application file for complete search history.

(56) References Cited

U.S. PATENT DOCUMENTS 5,819,156 A * 10/1998 Belmont .......................... 725/14
6,611,812 B2 * 8/2003 Hurtado et al. ................. 705/51
(Continued)

FOREIGN PATENT DOCUMENTS

EP 0 862 318 A2 9/1998
EP 1 359 581 A2 11/2003
(Continued)

OTHER PUBLICATIONS

Nick Gonzalez, Movie Downloads: iTunes v. The Rest, Oct. 15, 2006, http://www.techcrunch.com/2006/10/15/itunes-movies-v-the-rest/, pp. 1-4.
(Continued)

*Primary Examiner* — Christopher Revak
(74) *Attorney, Agent, or Firm* — Dinsmore & Shohl LLP (57) ABSTRACT

A data tracking system comprises a hub (1) for monitoring data transmissions passing through the hub. The hub (1) includes a store of audiovisual data files (2) and also has access to a number of external stores 3 of data files via respective Internet links (4). Data receivers (5), located within geographical territories (6), can access the hub (1) via respective Internet links (7) so as to request selected data files from one or more of the stores (2, 3). Each receiver (5) accesses the hub (1) in order to request a combination of data files in a desired format and for a selected platform. In response, the hub (1) collects the requested files from the appropriate stores combines them into a single file, together with an identity tag, and transmits the combined file and identity tag in an encrypted version to the receiver (5). Data transmissions are monitored in real time by a monitoring station (8), where information from the identity tag is used for accounting purposes.

15 Claims, 6 Drawing Sheets

(51) Int. Cl.
*G06F 21/10* (2013.01)
*H04N 21/2225* (2011.01)
*H04N 21/2343* (2011.01)
*H04N 21/2543* (2011.01)
*H04N 21/258* (2011.01)
*H04N 21/8352* (2011.01)
*G11B 20/00* (2006.01)

(52) U.S. Cl.
CPC ..... *H04N21/25833* (2013.01); *H04N 21/8352* (2013.01); *G11B 20/0021* (2013.01); *G11B 20/0084* (2013.01); *G11B 20/00181* (2013.01); *G11B 20/00731* (2013.01); *G11B 20/00847* (2013.01); *G11B 20/00855* (2013.01)

(56) References Cited

U.S. PATENT DOCUMENTS

| | | | |
|---|---|---|---|
| 6,618,709 B1 * | 9/2003 | Sneeringer | 705/412 |
| 7,089,304 B2 * | 8/2006 | Graham | 709/224 |
| 7,096,504 B1 * | 8/2006 | Tagawa et al. | 726/27 |
| 7,411,868 B2 * | 8/2008 | Kohmoto | 368/10 |
| 7,721,104 B2 * | 5/2010 | Salo et al. | 713/176 |
| 7,765,403 B2 * | 7/2010 | Stefik et al. | 713/176 |
| 7,818,216 B2 * | 10/2010 | Lawhorn | 705/26.35 |
| 7,884,274 B1 * | 2/2011 | Wieder | 84/609 |
| 8,095,467 B2 * | 1/2012 | Bettinger | 705/52 |
| 8,122,100 B2 * | 2/2012 | Raciborski et al. | 709/218 |
| 8,135,795 B2 * | 3/2012 | Birkestrand et al. | 709/208 |
| 8,191,091 B1 * | 5/2012 | Harvey et al. | 725/38 |
| 8,205,089 B2 * | 6/2012 | Stefik et al. | 713/176 |
| 8,234,302 B1 * | 7/2012 | Goodwin et al. | 707/783 |
| 8,260,881 B1 * | 9/2012 | Paleja et al. | 709/218 |
| 8,423,770 B2 * | 4/2013 | Loken | 713/170 |
| 2002/0173976 A1 * | 11/2002 | Martin et al. | 705/1 |
| 2004/0024688 A1 * | 2/2004 | Bi et al. | 705/37 |
| 2004/0117664 A1 * | 6/2004 | Colvin | 713/202 |
| 2004/0133801 A1 * | 7/2004 | Pastorelli et al. | 713/200 |
| 2004/0167977 A1 * | 8/2004 | Douglas et al. | 709/224 |
| 2005/0044228 A1 * | 2/2005 | Birkestrand et al. | 709/226 |
| 2005/0114711 A1 * | 5/2005 | Hesselink et al. | 713/201 |
| 2005/0289050 A1 * | 12/2005 | Narayanan et al. | 705/40 |
| 2006/0100924 A1 * | 5/2006 | Tevanian | 705/14 |
| 2008/0288411 A1 * | 11/2008 | Copley | 705/52 |
| 2011/0040688 A1 * | 2/2011 | Ren et al. | 705/59 |

FOREIGN PATENT DOCUMENTS

| | | |
|---|---|---|
| SG | 130009 A1 | 3/2007 |
| WO | 0245316 A2 | 6/2002 |
| WO | 02067130 A1 | 8/2002 |
| WO | 2004036388 A2 | 4/2004 |
| WO | 2008084222 A1 | 7/2008 |

OTHER PUBLICATIONS

Apple, Apple Launches EU iTunes Music Store [online], Oct. 26, 2004, http://www.apple.coni/pr/library/2004/oct/26itmseu.html, pp. 1-2.

International Search Report, PCT/GB2008/000060, Aug. 1, 2008, pp. 1-4.

* cited by examiner

DATA TRANSMISSION SYSTEMS

The present invention relates to data transmission systems in general, and more particularly to such systems for transmitting audiovisual data from a data library to end users.

There are currently many systems for enabling consumers to view audiovisual data, such as television programs or films. Not only are programs and films broadcast over both terrestrial and satellite television networks, but customers can purchase or hire recordings of such programs and films in many formats, such as VHS tapes, CD-Videos and, more recently DVDs.

In addition, audiovisual data can be obtained directly via the internet. In this case, the audiovisual data are typically transmitted in the form of streaming audiovisual data using e.g. .avi or .wmv files.

It would be desirable to provide arrangements which enable consumers to perform an online selection of audiovisual data from a library and to download the selected data in a desired format which can be viewed either in real time or at a later time of the consumer's choosing.

Thus, in accordance with a first aspect of the present invention there is provided a video data transmission system comprising: a source of data in the form of a library containing multiple video files; means enabling a user to select a plurality of said files for downloading; means for combining the selected files; and means for transmitting the combined files to the user.

With such a system, the task of combining two or more files selected by a user is performed by the system and not the user. This provides a convenient arrangement whereby users can create their own compilation of video data.

The data preferably comprises audiovisual data.

The combined files are advantageously encrypted before transmission, so that only the bona fide user who requested the audiovisual data is able to view it. Furthermore, by encrypting the file in real time during transmission, the file can be transmitted more quickly to the user, since there is no need to wait for the entire file to be encrypted in advance of transmission.

The combined selected filed may be formatted as an .iso file, and the user is preferably able to select a platform which defines the format of the audiovisual data to be transmitted. The platform may be a personal computer, an MP3 player, a television, a mobile telephone or a palmtop computer.

The transmitting means is preferably arranged to transmit the data to the user in a format which permits the user to store the data on a portable storage medium, such as a DVD or an MP3 player.

The system may be located within an internet server, the transmission means being arranged to transmit the data to the users via the internet.

In accordance with a second aspect of the present invention there is provided a data tracking system comprising: means for transmitting a plurality of data files, which are derived from one or more data sources, to a plurality of data receivers, the data receivers being arranged in groups; means for applying an identity tag to the data file to be transmitted which serves to identify the data file, the data source, and the group containing the data receiver; and means for tracking the transmissions of the data files by obtaining information from the identity tag of each transmitted data file.

Such a system enables an association to be made between the source of data and the territory of the receivers of the data. The system thus has particular benefit in gathering statistical information on data usage, such as would be beneficial when the rights to transmit certain data to users in different groups are owned by different respective entities.

Thus, the identity tag preferably further serves to identify a group rights owner for the data file for the group containing the data receiver, the system further comprising means for assigning a value to each transmission of each data file; and means for accumulating the resulting values in a respective store associated with each group rights owner.

The system advantageously further comprises means for inhibiting the transmission, of selected data files to data receivers in selected groups. The rights owners of the data may therefore be in a position to select the groups which are able to receive the data.

The data files can usefully be transmitted in one of a number of possible formats, with means being provided to inhibit the transmission of selected data files in at least one of the different formats to data receivers in selected groups. Thus, data rights owners are able to determine the formats which can be used for the different groups of receivers.

In this case, the transmission may be arranged to be inhibited only before a predetermined date or time.

The groups of receivers may each be located in different respective territories.

The system preferably further includes means for encrypting the tagged data file prior to transmission.

The plurality of data files may be located together within a server, and the transmitting means may then be arranged to transmit the data via the internet.

Each data file may be in the form of audiovisual data.

In accordance with a third aspect of the present invention there is provided a data transmission system comprising: data storage means for storing data derived from a plurality of data sources; means for receiving requests from a plurality of data receivers for data selected from the stored data; means for transmitting the selected data to the requesting data receivers; and means for obtaining information in respect of each data transmission, the information comprising the identity of the data source from which the data is derived and at least one characteristic of the data receiver, thereby enabling the data transmission distribution to be monitored in real time.

Such an arrangement can be in the form of a hub which either stores the data itself or which receives data from satellite data stores and which is arranged to monitor the data traffic. By arranging for the data requests to pass through the hub, it is possible for the distribution of data transmission within the system to be controlled.

The characteristic of the data receiver may advantageously comprise the territory in which the data receiver is located, or alternatively may comprises specifically the identity of the receiver.

The system preferably further comprises means for encrypting the data prior to transmission to the data receiver.

The system may itself comprise the plurality of data sources, and one or more of the data sources may act additionally as data receivers. In this case the data requested by these receivers will be stored elsewhere within the system.

Instead of the system being embodied as a central hub, the means for obtaining information may alternatively comprise a plurality of portions each located proximate a respective data source.

The system may also comprises the data receivers, and the data storage means may be located remote from the data receivers.

Preferred embodiments of the present invention will now be described with reference to the accompanying drawings, in which.

Figure 1:
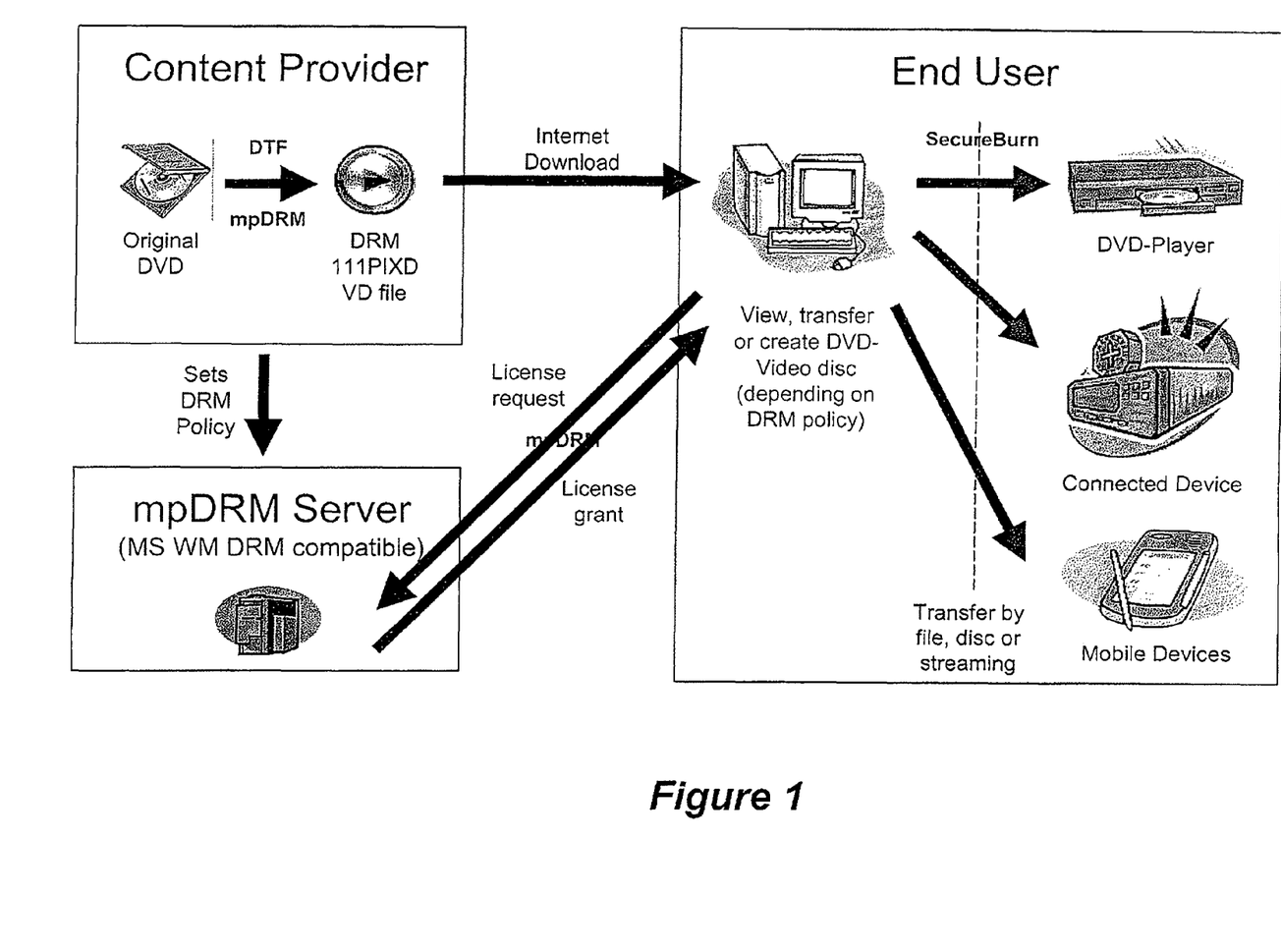
FIG. 1 illustrates the overall arrangement of a data transmission system in accordance with a first embodiment of the present invention.

Referring to FIG. 1, a source of audiovisual data in the form of a content service provider includes a store containing a library of audiovisual data files and, in addition, has access to further libraries of audiovisual files by means of external internet links. Each audiovisual file is stored in a number of different formats.

A data receiver, or user, is able to access a list of available audiovisual files via a personal computer, again using an internet link between the personal computer and the content service provider.

From the list of available files, the user selects at least two different files and submits a request to the content service provider for these files to be downloaded and at the same time indicates a desired format and platform for the files.

On receipt of the request, the content service provider collects together the requested audiovisual files in the desired format and creates a single combined .iso or .wmv file for transmission to the user. A tag is added to the file before transmission which identifies the source of the data and the territory in which the user is located. The file is protected using a proprietary anti-counterfeiting measure, such as the combination of an analog content protection and that marketed under the Registered Trade Mark "RipGuard" and is then encrypted during transmission in real time using the public encryption code of the user, such that only the user can decrypt the file.

When the user receives the file from the content service provider, it is able to store the file on a digital versatile disc (formerly known as a digital video disc) (DVD) and can then subsequently retrieve the data on a domestic DVD player. However, the anti-counterfeiting measure effectively prevents the user from making additional copies of the file on further DVDs.

As illustrated in FIG. 1, the user can alternatively request that the audiovisual data file be transmitted in a form suitable for direct viewing on the monitor screen of a personal computer.

As will be appreciated, the only hardware required by the user is a standard personal computer and a standard DVD burner and player. The software which is required is downloaded from the internet when a user becomes a subscriber of the data transmission system.

A major feature of this aspect of the present invention is that the content service provider creates an entire compilation of audiovisual files in response to a request from a user, and transmits the complete compilation back to the user in a format which enables the user either to view it in real time or to store it for future use. Each file may take the form of a short clip or excerpt from a feature film.

Figure 2:
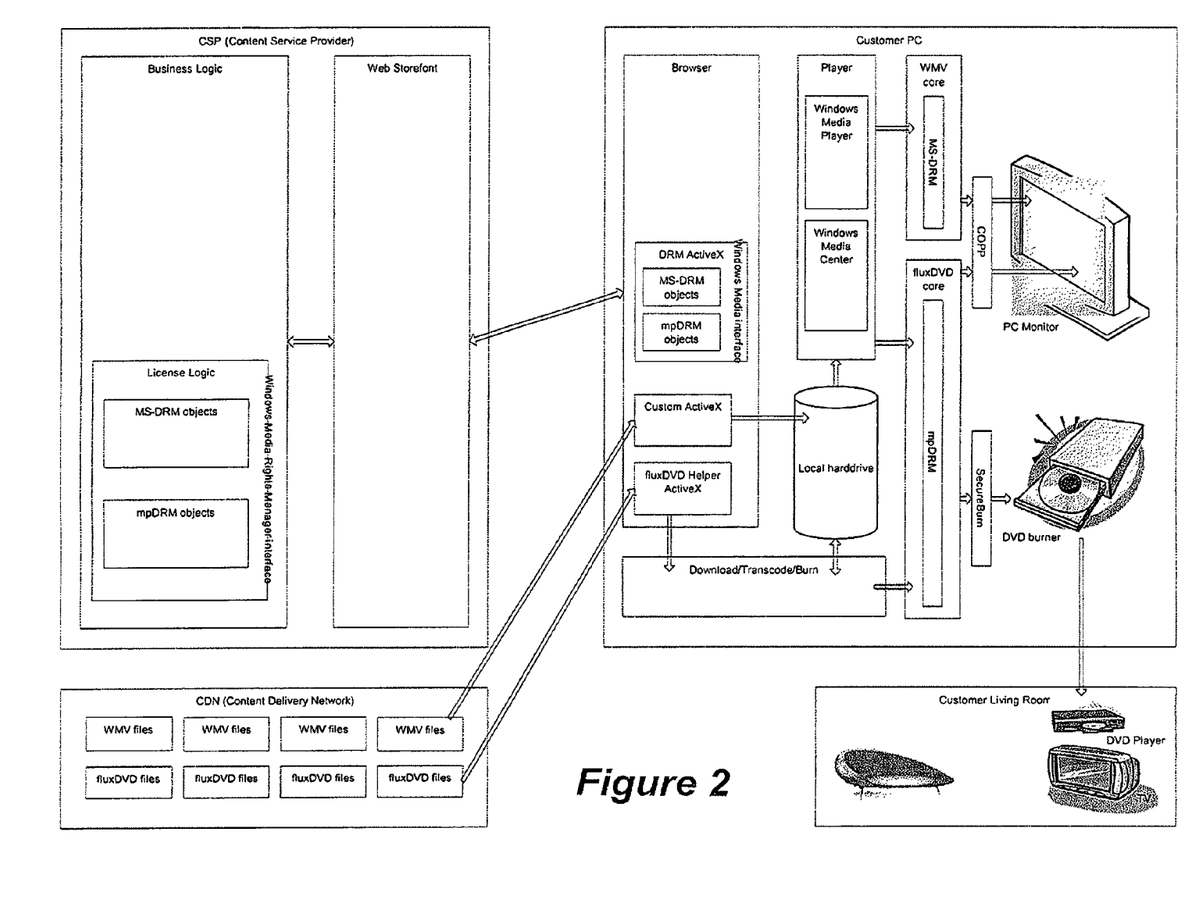
FIG. 2 illustrates a number of applications of the data transmission system of the first embodiment.

FIG. 2 illustrates further platforms which the user may desire to use for viewing the audiovisual data, such as a mobile telephone (cell phone). As can be seen from this drawing, the audiovisual data could be stored in the content service provider in the form of an original DVD.

Figure 3:
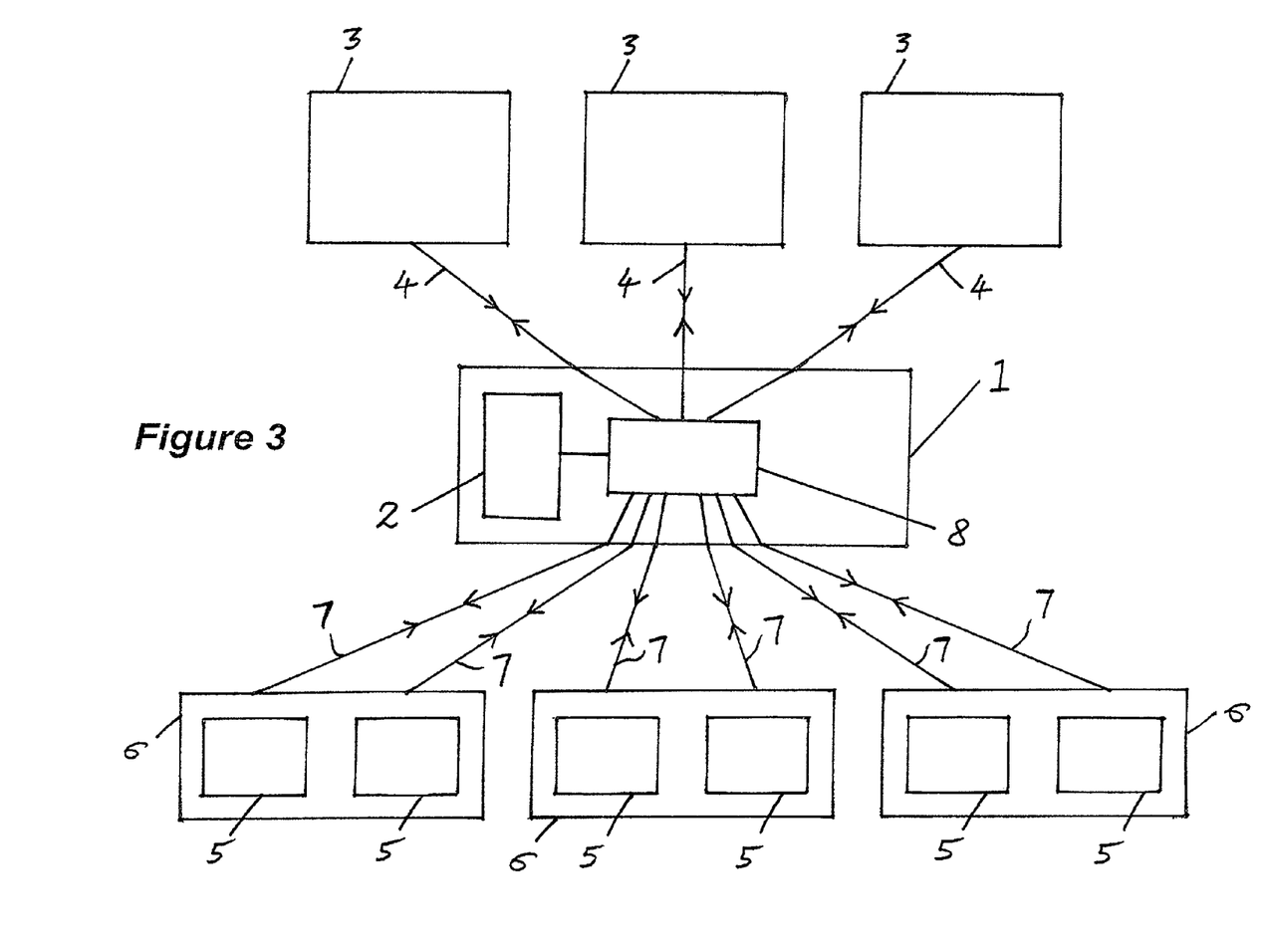
FIG. 3 illustrates schematically the functional units of a data tracking system in accordance with a second embodiment of the present invention.

Referring to FIG. 3, a preferred embodiment of the data tracking system of the present invention includes a central hub 1 which monitors all of the data transmissions passing through the hub. The hub 1 itself includes a store 2 of audiovisual data files but also has access to a number of external stores 3 of audiovisual data files via respective internet links 4. Data receivers or users 5, each located within one of a number of geographical territories 6, such as countries, groups of countries or continents, are arranged to access the hub 1 via respective internet links 7.

Each user 5 accesses the hub 1 in order to post a request for a combination of audiovisual data files selected from a list on the website of the system. The request includes an indication of the format in which the data is required by the user, such as the aspect ratio of the visual field, e.g. 4:3 or 16:9, and the platform for which the data is to be suited, e.g. real-time viewing on the monitor of the user's personal computer, viewing on a DVD to be created by the user on receiving the requested data, or a mobile device, such as a palmtop computer or a telephone. In response, the hub 1 collects the requested suitably formatted files from the respective sources where the desired files are stored and combines them together into a single file suitable for the desired platform, together with an identity tag, and transmits the combined file and identity tag to the user through an encryption stage which encrypts the combined file and identity tag using a public key associated with the user, so that only that user may decrypt the file.

The identity tag includes information identifying the source of the audiovisual data files, the identity of the user 5 and the territory 6 of the user 5. The sources of the data identified in the identity tag are not necessarily the same as the locations where the data files are stored but rather indicate the respective rights owners of the data files.

Each data transmission from the hub 1 to a user 5 is monitored by a monitoring station 8 within the hub 1, and the information in the identity tag is used to create an accounting system for calculating (a) the number and type of files downloaded by each user and (b) the number and type of files from each data source which are transmitted to users within each territory. The latter is useful in situations where the rights of transmission of certain data files are territorial, i.e. the ownership of the rights of transmission depends on the territory to which the data files are transmitted.

For example, a source of audiovisual data in the form of a film clip may be requested by a user located in Germany. If a given entity has distribution rights for that particular film clip in Germany, it will be necessary to monitor the data transmission of that film clip so that the entity can be appropriately compensated for the use of the film clip in Germany.

The monitoring station monitors the data transmission in real time, so that at any time, interested parties, such as the rights owners of the data and the territorial distribution rights owners are able to assess up-dated cumulative data transmissions.

In operation of the above system, a vendor of data sources offers to license the copyright in a number of different audiovisual recordings to a distributor. To achieve this, the vendor creates an offer for a given recording by entering the relevant data into a module on a computer terminal. The data specifies: (a) the available countries in which the recording can be downloaded; (b) the format or formats available for the recording, e.g. 35 mm film, film reel, DVD master, VCD master; (c) the start date of the offer; (d) the period of the license; and (e) the nature of the license, whether exclusive, non-exclusive or holdback. In addition, the offer specifies the percentage of the sales in respect of each of the available countries which the vendor is prepared to pay to the distributor by way of a bonus.

The offer can be amended or deleted by the vendor at any time by accessing the same module on the computer terminal.

In turn, distributors can view the vendors' offers and enter into a contract for the license of an available recording.

Figure 4:
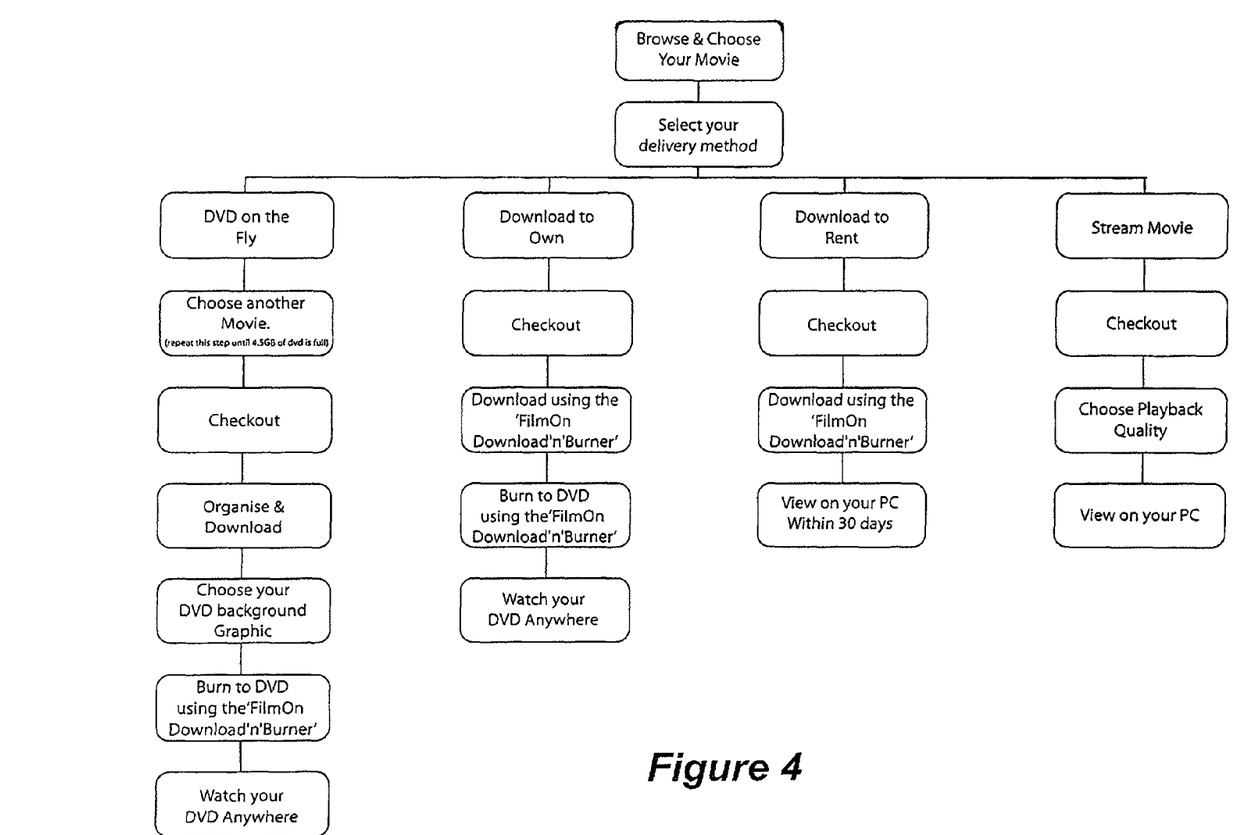
FIG. 4 illustrates the menu options available to an end user of the system.

The consumer's computer terminal displays a control panel which enables the consumer to select between various options for viewing the audiovisual content, for example "download to rent", "stream movie", "DVD on the fly" and "download to own". These options are illustrated in FIG. 4. Each film or program is made available to the consumer with one or more of these options.

Figure 5:
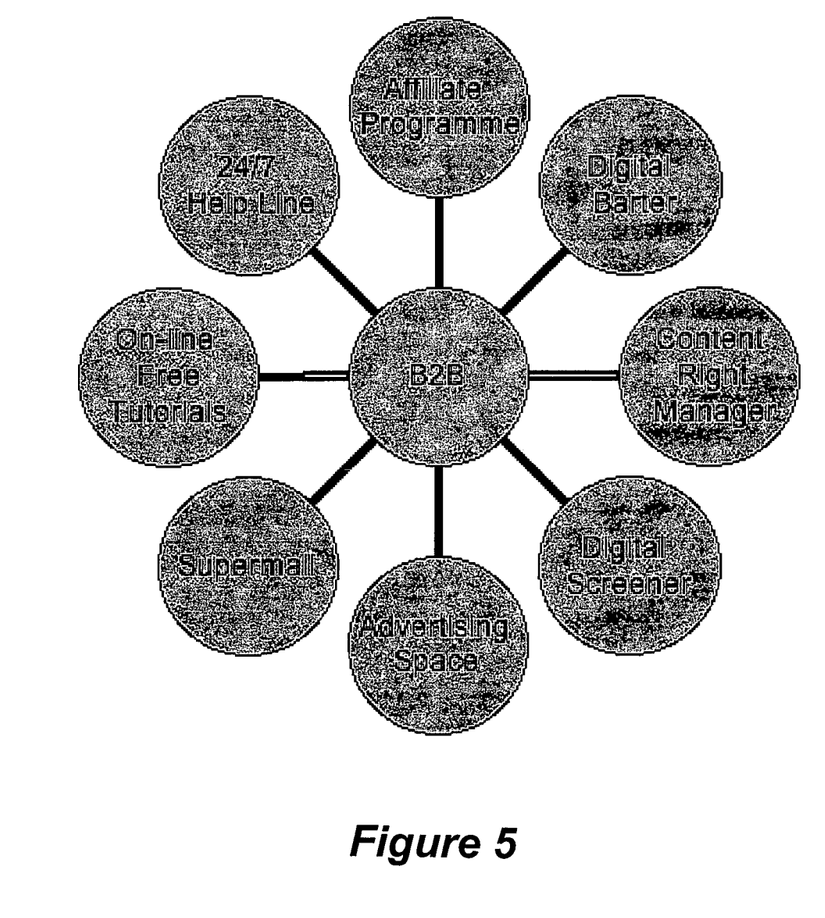
FIG. 5 illustrates the relationship between the components of a system in accordance with a preferred embodiment of the present invention.
Figure 6:
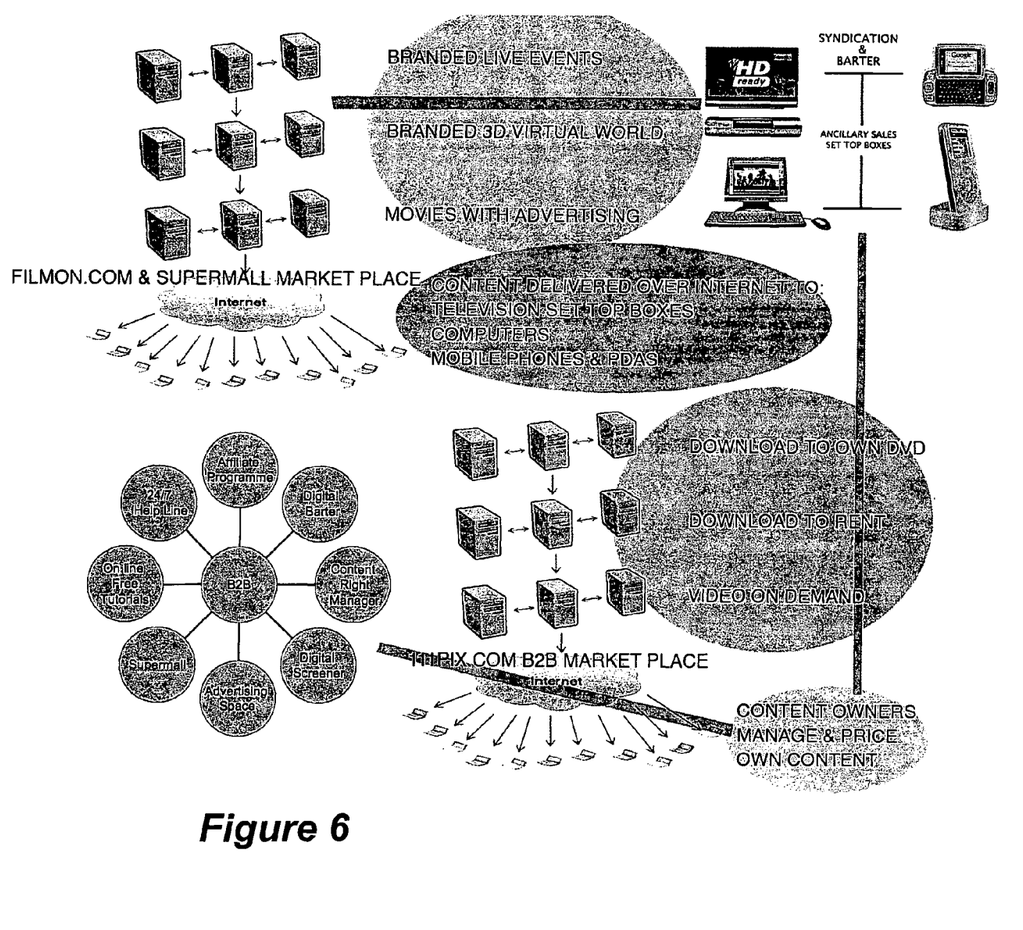
FIG. 6 illustrates the relationship between the components of a system in accordance with a further preferred embodiment of the present invention.

The relationships between the components of the above systems are illustrated in FIGS. 5 and 6.

The "download to rent" option is subdivided into following options:
 (a) whether to allow backup or restore; whether to allow the content to be copied on to a media carrier, e.g. burned on to a DVD;
 (b) the maximum number of times the content can be copied onto a media carrier;
 (c) whether the content can be played using P2P networks;
 (d) whether the content can be copied; the maximum number of times the content can be copies by the consumer;
 (e) any restrictions to the target devices for the copy process;
 (f) whether the content can be played;
 (g) the maximum number of times the content can be viewed;
 (h) whether to disable the computer's ability to adjust the computer's clock in an attempt to overcome a begin or expiration date requirement;
 (i) a start date for the license to become valid;
 (j) an expiration date for the license;
 (k) the time after which the license should expire after the first playback of the content;
 (l) the minimum client SDK version which is required; and
 (m) the minimum client security level which is required.

Furthermore, each recording has associated with it one or more keywords, which assists the consumer when searching for a recording to download.

The system also enables extracts of recordings, or "trailers" to be made available for free download by consumers.

From the above, it will be appreciated that the present invention is based on the realisation that the internet can change the way in which films and television programs can be distributed. The present invention provides particular advantages for sales agents, distributors and producers, since it enables members of the public to view audiovisual content, such as films and television programs on the internet at any desired time. In the preferred embodiment, content owners are provided with a control panel which permits the content owners to manage their films or television programs on line, and further enables content owners: (a) to set their own prices; (b) to set or block the territories to which they wish to sell; and (c) to set one or all of three rights they wish to exploit—(i) DVD download to own with copy protection; (ii) video on demand live streaming; and (iii) DVD download to rent with digital rights management (DRM). Furthermore, end-users are provided with a choice of three different qualities of playback depending on the connection speed.

To enable the owner of the rights in audiovisual data to make the above selections, they are presented with the various options on their computer screens. This enables the content owners to select the pricing of the various download options, to enter bibliographic data relating to the content, such as the genre of the film or program, the year of release, a synopsis of the plot, details of the actors appearing in the film, whether the film is in colour or black and white. In addition, the software enables the rights owners to view in tabular form all of their films, together with brief bibliographic details, and including links which can be used by the rights owners to establish vendor contracts incorporating the above options.

It will be appreciated that, although the present invention has been described above with respect to preferred embodiments, many variations are possible within the scope of the present invention which is defined solely by the appended claims.

The invention claimed is:

1. A data tracking system comprising:
 a transmitter, disposed in a centralized hub, for transmitting a plurality of data files, which are derived from at least one data source, comprising a rights owner for a given data file, to a plurality of data receivers, the data receivers being arranged in groups;
 a tag applicator for applying an identity tag to the data file to be transmitted, from the hub, which serves to identify the data file, the data source, the group containing the data receiver, and the territory in which the data receiver is located; and
 a tracker for tracking the transmissions, including the number and types of files from each data source which are transmitted to users within each territory, of the data files by obtaining information from the identity tag of each transmitted data file when it is transmitted from the hub.

2. A data tracking system as claimed in claim 1, wherein the identity tag further serves to identify a group rights owner for the data file for the group containing the data receiver, the system further comprising an assignment module for assigning a value to each transmission of each data file from the hub; and an accumulator for accumulating the resulting values in a respective store associated with each group rights owner.

3. A data tracking system as claimed in claim 1, further comprising an inhibitor for inhibiting the transmission, from the hub, of selected data files to data receivers in selected groups.

4. A data tracking system as claimed in claim 1, wherein the data files can be transmitted in one of a plurality of different formats, the system further comprising an inhibitor for inhibiting the transmission of selected data files, from the hub, in at least one of the different formats to data receivers in selected groups.

5. A data tracking system as claimed in claim 4, wherein the inhibitor is arranged to inhibit the transmission, from the hub, only before a predetermined date.

6. A data tracking system as claimed in claim 1, wherein each group of data receivers is located in a plurality of respective territories.

7. A data tracking system as claimed in claim 1, further comprising an encryption module for encrypting the tagged data file in real-time with the transmission.

8. A data tracking system as claimed in claim 1, wherein the plurality of data files are located together within a server, the transmitter is arranged to transmit the data, from the hub, via the internet and each data file comprises audiovisual data.

9. A data transmission system comprising:
 a database for storing data derived from a plurality of data sources;
 a receiver for receiving requests from a plurality of data receivers for data selected from the stored data in a hub;

a hub further comprising a transmitter for transmitting the selected data from the hub to the requesting data receivers; and the hub further comprising a monitoring unit for obtaining information in respect of each data transmission from the hub, the information comprising the identity of the data source from which the data is derived and at least one characteristic of the data receiver, thereby enabling the data transmission distribution to be monitored in real time at the point of transmission from the hub, wherein the characteristic of the data receiver comprises at least one of the territory in which the data receiver is located and the identity of the receiver;

wherein the monitoring unit tracks each transmission from the hub to calculate a number and type of files, from each data source, which are transmitted to users, within each territory;

wherein the monitoring unit is further configured to allow a rights owner, of each data source, to access cumulative data transmissions; and wherein the data transmission system further comprises a control panel to set or block a set of territories to which they wish to sell.

10. A system as claimed in claim 9, further comprising an encryption module for encrypting the data prior to transmission to the data receiver.

11. A system as claimed in claim 9, further comprising the plurality of data sources.

12. A system as claimed in claim 11, wherein at least one of the data sources acts additionally as a data receiver.

13. A system as claimed in claim 9, wherein the monitoring unit comprises a plurality of portions each located proximate a respective data source.

14. A system as claimed in claim 9, further comprising the plurality of data receivers.

15. A system as claimed in claim 14, wherein the database is located remote from the data receivers.

* * * * *